US009544383B1

(12) United States Patent
Calkins et al.

(10) Patent No.: US 9,544,383 B1
(45) Date of Patent: Jan. 10, 2017

(54) PARTICIPANT LIST

(71) Applicant: Appian Corporation, Reston, VA (US)

(72) Inventors: Matthew Wheeler Calkins, Great Falls, VA (US); Robert Charles Kramer, Arlington, VA (US)

(73) Assignee: Appian Corporation, Reston, VA (US)

( * ) Notice: Subject to any disclaimer, the term of this patent is extended or adjusted under 35 U.S.C. 154(b) by 753 days.

(21) Appl. No.: 13/788,505

(22) Filed: Mar. 7, 2013

(51) Int. Cl.
*G06F 15/167* (2006.01)
*H04L 29/08* (2006.01)

(52) U.S. Cl.
CPC ..................................... *H04L 67/24* (2013.01)

(58) Field of Classification Search
CPC ...... G06F 15/16; G06Q 30/0631; H04M 3/56; H04L 67/24
See application file for complete search history.

(56) References Cited

U.S. PATENT DOCUMENTS

| | | | |
|---|---|---|---|
| 8,271,894 B1 | 9/2012 | Mayers | |
| 8,838,708 B1* | 9/2014 | Rhodes et al. | 709/206 |
| 2006/0067499 A1* | 3/2006 | Oliveira et al. | 379/202.01 |
| 2009/0216551 A1 | 8/2009 | Chen et al. | |
| 2010/0223341 A1* | 9/2010 | Manolescu et al. | 709/206 |
| 2011/0010182 A1 | 1/2011 | Turski et al. | |
| 2012/0109836 A1 | 5/2012 | Chen et al. | |
| 2012/0203832 A1 | 8/2012 | Vastardis et al. | |
| 2012/0278127 A1* | 11/2012 | Kirakosyan et al. | 705/7.29 |
| 2012/0324589 A1* | 12/2012 | Nukala | H04L 67/1097 726/28 |
| 2013/0024786 A1* | 1/2013 | Dayal | 715/753 |

OTHER PUBLICATIONS

Jason Watson et al., "+Your Circles: Sharing Behavior on Google+," Symposium on Usable Privacy and Security (SOUPS) 2012, Jul. 11-13, 2012, Washington, DC, USA, pp. 1-10.
Hongxin Hu et al., "Enabling Collaborative Data Sharing in Google+ (Technical Report, SEFCOM, Mar. 2012)," Arizona State University, Tempe, AZ 85287, USA, pp. 1-13.
Google+ Sharing, "Create circles and start sharing—Google+", www.google.com/+learnmore/sharing/, [retrieved Dec. 7, 2012], 4 total pages.
"How to Keep People from Seeing All Your Facebook Info," http://lifehacker.com/5808175/how-to-keep-people-from-seeing-your-facebook-info, [retrieved Dec. 13, 2012], 5 total pages.
"The Internet Patrol: How to Unsubscribe from a Message Thread on Facebook—The Internet Patrol," http://www.theinternetpatrol.com/how-to-unsubscribe-from-a-message-thread-on-facebook/ [Dec. 19, 2012 9:18:08 AM], 4 total pages.
"Organizing Gmail with Google+ circles," support.google.com/mail/bln/answer.py?hl&an&answer=1734792 [retrieved Dec. 7, 2012], 2 total pages.
The Real Life Social Network, Paul Adams, http://www.slideshare.net/padday/the-real-life-social-network-v2, Jul. 1, 2010, 224 total pages.

* cited by examiner

*Primary Examiner* — Hamza Algibhah
*Assistant Examiner* — Anh Nguyen
(74) *Attorney, Agent, or Firm* — Fish & Richardson P.C.

(57) ABSTRACT

In one implementation, entries may be received in a social network platform. The entries may include an entry associated with a participant list. The participant list may identify one or more users as a participant for the entry. A filter request for a user may be received. The filter request may be a request to filter the received entries based on the presence of the user in the participant list. The received entries may be filtered based on the presence of the user in the participant list. The filtered entries may be provided to the user.

19 Claims, 7 Drawing Sheets

FIG. 5

PARTICIPANT LIST

TECHNICAL FIELD

The following disclosure generally relates to electronic communications.

BACKGROUND

Social networking service platforms permit information to be easily and rapidly communicated among a large number of people.

BRIEF DESCRIPTION OF THE FIGURES

FIG. 5 is an example interface showing a locked entry.

Like reference symbols in the various drawings indicate like elements.

DETAILED DESCRIPTION

Figure 1:
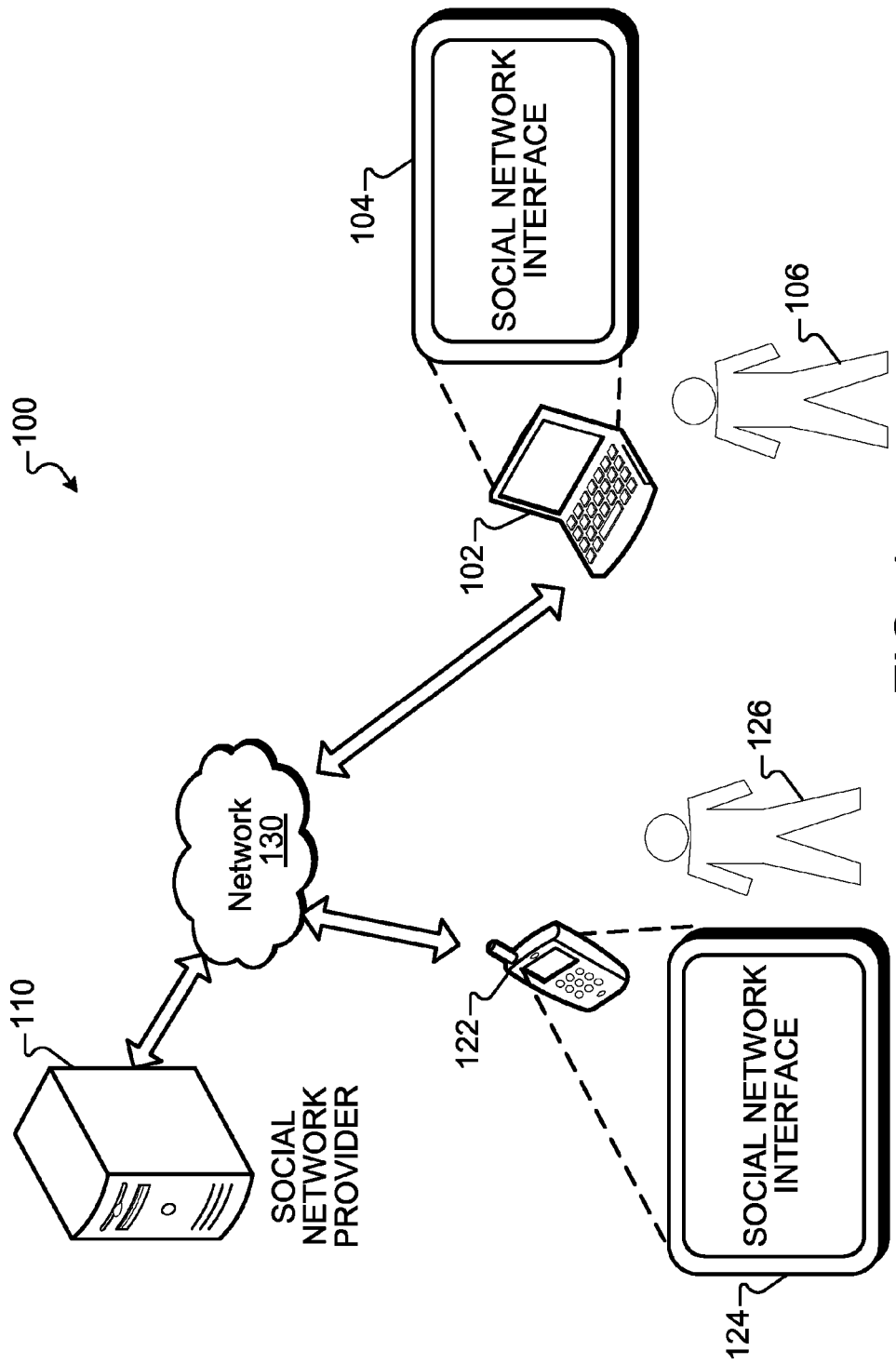
FIG. 1 illustrates an example system for a social network using participant lists.

Social networking service platforms permit information to be easily and rapidly communicated among a large number of people. Information in the platforms may be communicated in the form of entries. An entry may be a discrete amount of information, for example, a message, a post, or an event.

A message may be a communication sent between a user and one or more other users. The one or more other users may be designated as recipients by the user. For example, a user may create a communication with the text "let's meet at 10" and designate that another user should be a recipient of the communication. The communication may be a message because the communication has a designated recipient. In some implementations, messages may only be perceived (e.g., seen) by the sender (or senders) and the designated recipients. In other implementations, messages may be perceived by other users in addition to the designated recipients and the sender. For example, in some implementations, messages may be seen by any Internet user. In other implementations, messages may only be seen by authenticated users able to securely access the post on the social networking platform. The social networking platform may be, for example, specific to a company, and the authenticated users may be all employees of the company. As described in further detail below, the designation of the recipients may be used to generate a participant list that serves the purpose of increasing the likelihood that those particular recipients will have their attention drawn to the message.

A post may be a communication without designated recipients. For example, a user may create a communication with the text "I feel great" without designating any recipients. In some cases, posts may be seen by any user, e.g., any Internet user. In other implementations, posts may only be seen by a subset of users. For example, posts may only be seen by authenticated users able to securely access the post on the social networking platform. The social networking platform may be, for example, specific to a company, and the authenticated users may be all employees of the company. A post is different from a message in that a poster, unlike a message sender, does not designate recipients of the post. Instead, the poster knows the community of users that will be able to perceive the post by virtue of the context in which the post was created (e.g., if the post is provided to the company's secure social networking platform, the poster knows that only fellow employees able to access the company's secure intranet will be able to perceive the post).

An event may be a communication generated by the social networking platform or system. For example, the system may detect that a condition has been met and generate a communication stating how the condition was met. Events may also be messages or posts. For example, the system may generate an event that has designated recipients or may generate an event that does not have designated recipients, e.g., the system may determine that Client A has failed to pay for Product B within a six month designated payment window and generate an event specifying "Client A has failed to pay for Product B within the six month designated payment window. In the example, the system may generate the event as a post with no designated recipients or may generate the event as a message with designated recipients, e.g., users that handle accounts receivable. The system may generate events for other conditions, for example, when a client has made a payment, when a product is released, or when a product is updated, etc.

The social networking platform or system may provide users with access to a social feed to enable the users to view entries. A social feed is a list of entries stored by the system. For example, a user may create a post "I'm going to Florida," and this post may appear in the social feed of users of the social networking system. The users of the social networking system may then comment on this post by creating posts associated with the original post. Alternatively, the user may create a message "I'm going to Florida," and designate a few recipients so that while all users of the system may see the message, the designated recipients have their attention especially drawn to the message.

Each user may have access to the system's social feed, which may be dynamically updated with new entries over time as, for example, new events occur, new posts are posted, and new messages are sent. In some implementations, the system's social feed may be tailored by or for a user to include or exclude particular entries based on that user's preferences (e.g., User A designates in his preferences to exclude from the social feed all entries related to Topic A or all messages sent from Sender B).

However, with numerous entries in the social feed of the system, the entries may lack persistence, e.g., perceivability to users. For example, the entries in the social feed may be in a reverse chronological order by creation date. If one hundred further entries are made, the post "I'm going to Florida" may be displayed below the newer entries and forgotten by users. In a non-business setting, entries may not be important and forgetting entries may not be consequential. However, in a business setting, forgetting entries may be detrimental, for example, if the entry is regarding a business project. Persistence may be provided in the social network platform through participant lists, as described in more detail below.

FIG. 1 illustrates an example system 100 for a social network using participant lists. The system 100 may include a client device 102. The client device 102 may be a portable computing device, e.g., a laptop, a tablet, a phone, etc., or a non-portable computing device, e.g., a desktop computer.

The client device 102 may provide a social network interface 104 to a user 106. For example, the client device 102 may output a social network interface 104 on a display, e.g., a liquid crystal display (LCD), of the client device 102 and receive input from the user 106 by the social network interface 104. The user 106 may interact with the social network interface 104 to communicate with other users by creating and perceiving (e.g., viewing) entries associated with participant lists. For example, the user 106 may view entries created by other users and may create an entry, which may be post or may instead be a message sent to one or more designated recipients.

The client device 102 may be in communication with a social network provider 110 through a network 130, for example, an intranet or the Internet. The social network provider 110 may be hardware, e.g., one or more computers, one or more processing devices, or one or more servers, etc. The social network provider 110 may receive entries from client device 102 and provide received entries to the client device 102. For example, the social network provider 110 may receive an entry created by the user 106, e.g., a message or a post, and provide another entry for display to the user 106.

The social network provider 110 may be in communication with a second client device 122. The second client device 122 may function similarly to the first client device 102 and provide a second social network interface 124 to a second user 126. The second social network interface 124 may be similar to the social network interface 104 provided to the user 106. The user 106 and second user 126 may communicate with each other through entries handled by the social network provider 110 by using their respective social network interfaces 104 and 124 provided by their respective client devices 102 and 122.

Figure 2A:
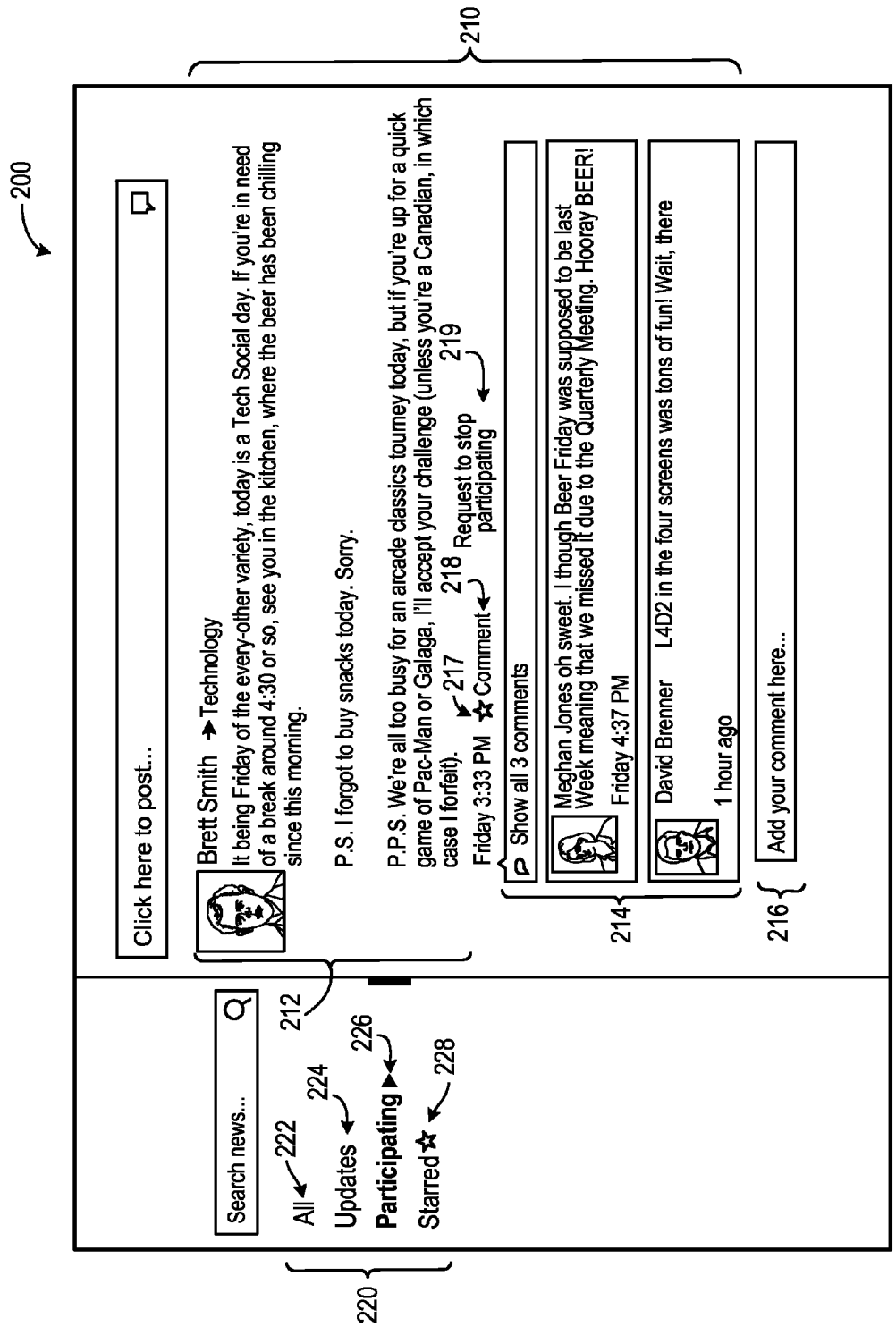
FIG. 2A shows an example interface for filtering and/or sorting entries using participant lists.

FIG. 2A shows an example interface 200 for filtering and/or sorting entries using participant lists. Interface 200 is explained in reference to system 100 described in FIG. 1. However, interface 200 may be used with alternate systems or different configurations of system 100. The interface 200 may be an example of the social network interface 104 or the second social network interface 124. The interface 200 may be used to view a social feed 210 that lists entries generated by or provided to the social networking system 100. The social feed 210 may list different entries depending on the entries in the system 100. For example, the social feed may list the twenty most recently created entries in the system 100 in reverse chronological order.

In interface 200, the display of the social feed 210 shows example entries 212 and 214. The entry 212 is an entry having the group "Technology" as the designated recipient. Because the entry 212 includes a designated recipient, the entry 212 may be considered a message. The entry 212 further includes an identification of the creator of the entry, e.g., "Brett Smith," communication content to be conveyed, e.g., the message text, the date and time the entry 212 was created, e.g., Friday 3:33 PM, and graphical elements selectable to interact with the entry 212, e.g., a graphical element 217 selectable to "star" the entry and a graphical element 218 selectable to comment on the entry 212.

The entries 214 may be associated with the entry 212. Associated entries, which also may be referred to as related entries, are entries created by users after perceiving another entry and that are submitted by the users in response to the perceived entry. For example, entries 214 may be comments to entry 212 and, therefore, may be referred to as associated or related entries. The relationship between entries 214 and 212 may be visually shown by indenting entries 214 and positioning them below the entry 212 in chronological order. The social feed 210 may include a comment textbox 216 below the last associated entry, or in the case where there are no associated entries, below the original entry. Users may create another entry associated with the entry 212 by entering text into the comment textbox 216. In some implementations, users may, additionally or alternatively, create another entry by selecting the graphical element 218 to trigger presentation of a comment textbox in, for example, a pop-up window.

In some implementations, the social feed 210 only includes the entries depicted in FIG. 2A and, therefore, does not include any entries unrelated to entry 212. In other implementations, the social feed 210 includes multiple additional entries unrelated to entry 212 that, while not depicted in FIG. 2A, may be subsequently displayed through user interaction with a user interface element, such as, for example, a scroll bar. The additional unrelated entries may be displayed in reverse chronological order in the social feed 210.

Entry 212 may be associated with a participant list. A participant list may be a list of users associated with an entry. The participant list may be used to determine what entries appear in the user's social feed 210. In some implementations, the user 106 may select to choose to filter the user's social feed 210 to only show entries for which the user 106 is in the participant list of the entry. Accordingly, the entries for which the user 106 is a listed participant may be given more persistence for the user 106 than entries where the user 106 is not a listed participant.

The participant list may list all the participants of an entry by listing users and groups. A user may be considered a participant of an entry if the user is in the participant list by either having a corresponding user identifier be directly listed in the participant list or a corresponding user identifier be included in a group having a group identifier directly listed in the participant list.

Users or groups of users in a participant list may belong to, for example, one of multiple different participant categories. In one implementation example, users or groups of users are assigned to one of four different participant categories: (1) an entry originator category; (2) an original recipient category; (3) an added recipient category; and (4) an associated entry originator category.

Entry originators may be assigned to the entry originator category. An entry originator is a user, a group of users, or a system process that created the original entry associated with the participant list, e.g., the system process "Company Billing Bot" that generates events. In the example shown in FIG. 2A, the entry originator for the entry 212 is a user having the user identifier "Brett Smith." As such, the participant list for entry 212 may include the user identifier "Brett Smith" and that user identifier may be assigned to the entry originator category. Notably, the entry originator category is directed to originators of entries that are not related to or otherwise associated with other entries. Originators of associated entries are instead assigned to the associated entry originator category, as described in further detail below.

Users that the entry originator designated as recipients of the entry when the entry originator created the entry may be assigned to the original recipient category. For example, the entry originator may designate a user or a particular group of users as a recipient of an entry so that the attention of the user or users within the particular group is drawn to the entry. As discussed above, the entry originator be a user, a group of users, or a system process. In the example shown in FIG. 2A, the entry 212 is a message because it has a designated recipient, and the designated recipient is the "Technology" group of users. The participant list for entry 212, therefore, may include the group identifier "Technology" and/or may include the user identifiers for each of the users within the "Technology" group. The group identifier "Technology" and/or the user identifiers for each of the users within the "Technology" group may be assigned to the original recipients category. In another example, a system process may be an entry originator and determine that particular users should be original recipients.

Users that are added to a participant list by another user or a system process may be assigned to the added recipients category. For example, a user may think that another user or group of users should be a participant of a particular entry. Through interactions with the system 100, the user may add the other user or group to the participant list of that entry. In the example shown in FIG. 2A, the user having the user identifier "Meghan Jones" may believe that someone outside the "Technology" group, such as, for example, the user "Chris Hardy" should also be a recipient of the message 212 and, therefore, may wish to add them to the participant list of the entry 212. By interacting with the system 100, "Meghan Jones" may add the "Chris Hardy" to the participant list of entry 212 and, as a result, may also assign "Chris Hardy" to the added recipients category.

Users that created another entry associated with the entry associated with the participant list, e.g., an entry commenting on another entry, may be assigned to the associated entry originator category. A user that creates a second entry associated with a first entry may be considered to be a contributor to the first entry. Any user that creates a second entry associated with a first entry may be added to the participant list associated with the first entry. In the example shown in FIG. 2A, while the entry 212 was directed to the "Technology" group, the entry 212 could, nevertheless, be viewed by any employee of the company with authenticated access to the company's intranet. As shown in FIG. 2A, a user having the user identifier "David Brenner" viewed the entry 212 and added an entry commenting on the entry 212. If "David Brenner" is not within the "Technology" group, then the user identifier "David Brenner" may be added to the participant list of entry 212 as a result of the creation of the associated entry and may be assigned to the associated entry originator category.

The number of categories may be increased or decreased, and different types of categories may be used. For example, the four categories described above may be combined, divided, or removed, and another category may be added. In some implementations, all of the categories are mutually exclusive such that a user may only be placed in a single category. In other implementations, some or all of the categories are not mutually exclusive such that a user may be assigned to more than one category. For example, a user that is assigned to the added recipient category may also be assigned to the contributor/associated entry originator category if that user also comments or otherwise adds an associated entry.

Entries may be considered unitary in respect to participant lists. For example, an original entry and any entries associated with the original entry, e.g., comments on the original entry, may share the same participant list. Accordingly, a user creating a second entry associated with a first entry, e.g., commenting on the first entry, may be added to the participant list shared by the first entry and second entry. In the example shown in FIG. 2A, for example, the entry 212 and the associated entries 214 all may share the same common participant list. Alternatively, in some implementations, entries may be considered non-unitary, so entries may be associated with separate participant lists. For example, each entry may be associated with an individual participant list.

Users may be removed from participant lists. For example, a user may request to be removed as a participant or another user may request the user be removed from a participant list. The graphical element 219 may be selected by the user to request that the user be removed from the participant list of entry 212. Selecting the graphical element 219 may alternatively or additionally cause an overlay panel to appear in which the user may designate one or more users to remove from the participant list of entry 212. The removal request may be automatically processed by the system 100 or manually reviewed by an administrator of the system or another user with privileges to confirm removal requests.

The participant list (or, in some implementations, metadata distinct from but associated with the participant list) may identify the category (or categories) to which each user or group of users within the participant list belongs. For example, a participant list for one entry may identify or be associated with metadata that identifies the user "Bob" as the entry originator, and a participant list for a different entry may identify or be associated with metadata that identifies the user "Bob" as an added recipient. When filtering a social feed for entries where the user is a participant, the entries may be further sorted and/or filtered based on the participant list category (or categories) assigned to the user and/or based on assigned priorities. For example, entries having participant lists in which the user has been assigned to the first category (i.e., entry originator) may be given highest priority, followed by entries having participant lists in which the user has been assigned to the second category (i.e., original recipient), entries having participant lists in which the user has been assigned to the third category (i.e., added recipient) and then entries having participant lists in which the user has been assigned to the fourth category (i.e., contributor or associated entry originator). The interface 200 may display the entries within a social feed to the user in an order based on the assigned priority. For example, entries given the highest priority may be displayed first in a list, followed by the second highest priority entries, the third highest priority entries and the fourth highest priority entries, in that order. Each set of entries within a given priority grouping may be displayed, for example, in reverse chronological order.

In some implementations, the entries in the social feed may be filtered to only display entries in which the user has been assigned to one (or more) of a subset of the existing participant categories (or priority groupings). For example, the entries in the social feed may be filtered to only display entries in which the user has been assigned to the first category (i.e., entry originator) or to the second category (i.e., original recipient).

The interface 200 may include a filtering/sorting option area 220. The filtering/sorting option area 220 includes various graphical elements that each correspond to a different filtering and/or sorting option. The filtering/sorting options may be selected by the user by, for example, moving a graphical pointer element (e.g., through interactions with a user interface device like a mouse or a trackball) such that it is positioned over a graphical element corresponding to a desired filtering/sorting option and then triggering an interaction with that graphical element (e.g., by pressing a button on the mouse or trackball). In another implementation, the user interface 200 may be displayed on a touch-sensitive surface (e.g., a touch screen) and the user may use a finger or a stylus to touch the touch-sensitive surface at a position corresponding to the displayed graphical element of a desired filtering/sorting option, thereby selecting it.

In the implementation example shown in FIG. 2A, the filtering/sorting option area 220 includes four different graphical elements 222, 224, 226 and 228 corresponding to different filtering/sorting options. The first graphical element 222 displays the text "All" and may be selected by the user to view all entries that the user is able to access, irrespective of whether the user is included in participant lists associated with those entries. As such, selection of element 222 allows the user to view an unfiltered list of all entries within social feed 210.

A second graphical element 224 that displays the text "Updates" may be selected by the user to sort and/or filter the displayed entries based on most recent activity. For example, selection of the graphical element 224 may result in only those entry families (i.e., the single, original, unrelated/unassociated entry and its zero, one or more related/associated entries) that include at least one entry that was recently generated or updated (e.g., generated or updated within the past two days) within the social feed 210 being shown and all other entries being filtered out. In some implementations, the user interface 200 additionally or alternatively includes a first graphical element selectable to show only those entry families in the social feed 210 for which the original, unrelated entry was recently generated and a second and different graphical element selectable to show only those entry families in the social feed 210 for which an associated or related entry was recently generated or updated. In another implementation, selection of the graphical element 224 does not result in a filtering of entries within the social feed 210 but rather instead results in a sorting of entries such that those entries (or entry families) that have been recently generated or updated are displayed more prominently (e.g., at the top of the list in reverse chronological order) than older entries. In other implementations, selection of the graphical element 224 may result in only those entries, rather than entry families, that were recently generated or updated within the social feed 210 being shown and all other entries being filtered out.

In some implementations, each entry family corresponds to a conversation about a topic. The single, original unrelated/unassociated entry is a communication that initially introduces the topic to an audience, and the related/associated entries are comments later made about the topic by the audience (and/or by the unrelated/unassociated entry originator). FIG. 2A may, therefore, depict a single entry family or conversation, with entry 212 being the single, original unrelated/unassociated entry that introduced a topic and entries 214 being related/associated entries that comment on the topic. In some implementation, each entry family or conversation shares the same participant list. In other implementations, each individual entry has its own participant list, which may or may not be identical to all other entries within the same entry family or conversation.

A third graphical element 226 that displays the text "Participating" may be selected by the user to sort and/or filter the displayed entries based on whether the user is included within the participant lists associated with the entries and/or within particular participant categories within the participant lists. In some implementations, selection of the graphical element 226 may filter out all of the entries within the social feed 210 having participant lists that do not include a user identifier corresponding to the user. In other implementations, selection of the graphical element 226 may instead sort the entries within the social feed 210 to more prominently display those entries having participant lists that include a user identifier corresponding to the user (e.g., places the entries having participant lists that include a user identifier corresponding to the user at the top of the social feed's displayed list of entries). In some implementations, the interface 200 may include graphical elements (e.g., graphical buttons, displayed text, menus, windows, etc.) that may be interacted with or selected by the user to further filter or sort the entries within the social feed 210 based on the user's assigned participant category and/or a predetermined or previously assigned entry priority.

A fourth graphical element 228 that displays the text "Starred" may be selected to enable the user to view those entry families or individual entries that were "starred" by or for the user. A particular entry family or individual entry may be designated as a starred entry, for example, in response to a user interacting with the user interface while perceiving the particular entry family or individual entry to thereby select and designate the entry family or individual entry as being of particular interest to the user (e.g., by manually selecting or clicking on a star icon or graphical element displayed in close proximity to the original and unrelated entry to star the corresponding entry family or by manually selecting or clicking on a star icon or graphical element displayed in close proximity to any entry to star the corresponding individual entry). "Starring" an entry family or an individual entry is similar to bookmarking a Web page or adding a Web page to a favorites list in a Web browser except that the "starring" is applied to a social feed entry family or individual entry, rather than to a Web page. In some implementations, a different user may alternatively or additionally be able to star entry families or individual entries for the user.

In some implementations, selection of the fourth graphical element 228 results in the entries of the social feed 210 being filtered to only display those individual entries or entry families that have been designated as starred entries by or for the user. In other implementations, selection of the fourth graphical element 228 results in entries of the social feed 210 being sorted such that those individual entries or entry families that have been starred are displayed more prominently than other entries (e.g., the "starred" entry families are displayed at the top of a list of the entries of the social feed 210).

While interface 200 includes a particular combination of graphical elements selectable to perform the above-described filtering and sorting options, other interfaces may use alternate or additional graphical elements to enable the user to perform the same filtering and sorting options described above or to perform different filtering and sorting options that leverage participant lists in a different way than that described above. For example, in some implementations, a user interface may be provided that uses other graphical elements such as, for example, menus, graphical buttons, and/or pop-up windows with which the user may interact to select the different filtering and sorting options. In some implementations, a user interface may be provided that includes graphical elements selectable to simultaneously or sequentially perform a combination of two or more of the sorting and filtering functions noted above (e.g., filtering based on the user being within a particular participant category and then sorting the filtered set of entries based on recent activity, or filtering based on the entries being starred and then further filtering the entries based on the user being within a particular participant category). The filtering and sorting options may be applied to sort and/or filter individual entries as discrete units based on individual entry participant lists and/or may be applied to sort and/or filter entry families as discrete units based on entry family participant lists.

In the implementation example shown in FIG. 2A, the interface 200 shows that the third graphical element 226 has been selected, which has resulted in a display of only those entries in the social feed 210 associated with a participant list that includes the user. As such, entries 212 and 214 are shown in the social feed 210. Entry 212 has the group "Technology" as the designated recipient, and the user is a member of the group "Technology" and, therefore, is included in the participant list of the entry 212. In some implementations, entries 214 are associated with the entry 212 and, therefore, have the same participant list as the entry 212. Each entry 214 may have its own participant list that is identical in content to that of entry 212, or, alternatively, all of the entries 212 and 214 may be associated with a same, single participant list.

Figure 2B:
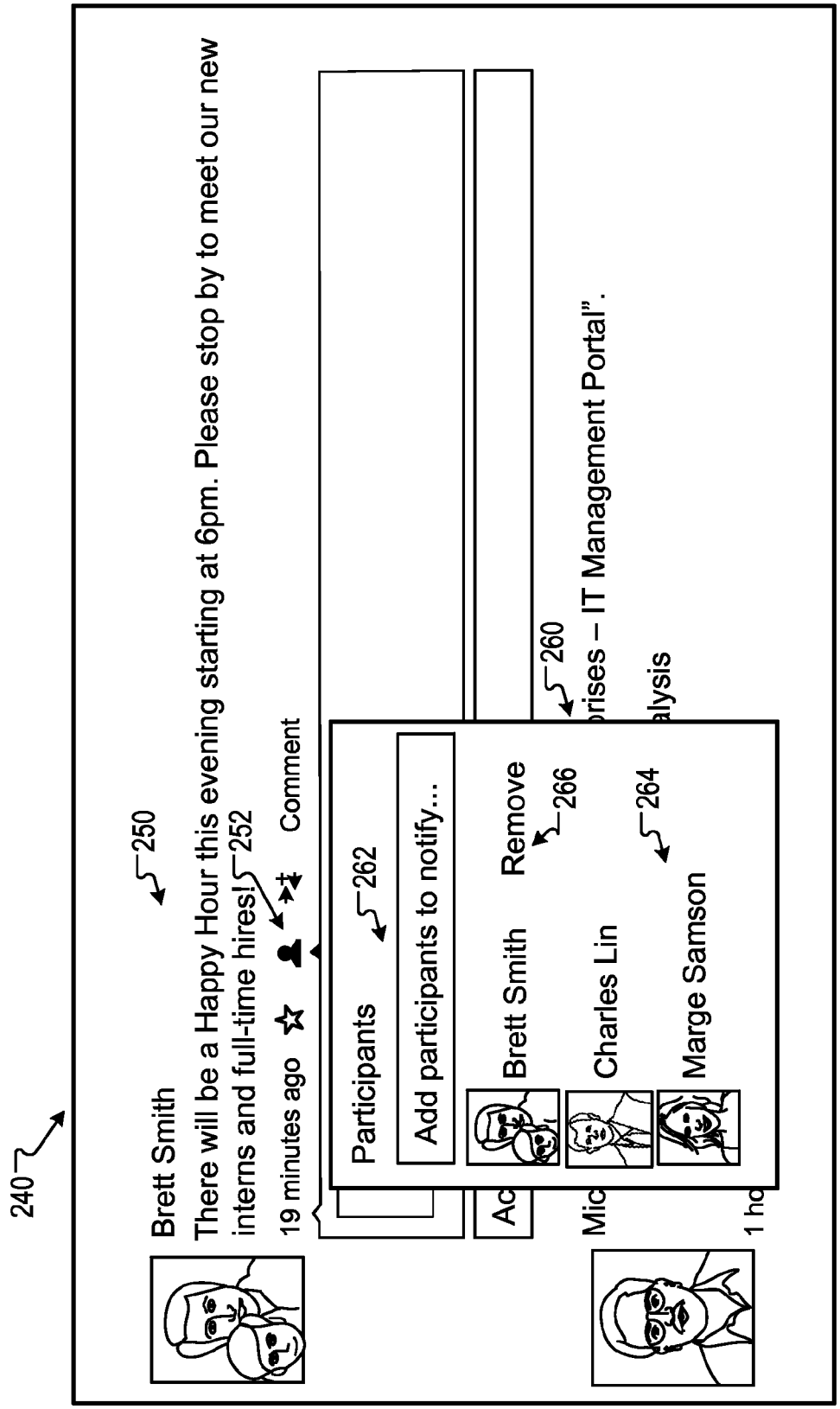
FIG. 2B shows an example interface for managing a participant list.

FIG. 2B shows an example interface 240 for managing a participant list 264. The interface 240 may include a panel 260 that appears when an icon 252 representing the participant list 264 for the entry 250 is selected. The icon 252 may be an outline of a person's head and shoulders. The panel 260 may include a recipient textbox 262 in which a user may type in the name of a user to add as a designated recipient. The panel 260 may also list all the users or groups in the participant list 264. For example, the participant list 264 lists "Brett Smith," "Charles Lin," and "Marge Samson" as participants for entry 250.

While the participant list 264 shown does not show any distinction between the categories of participants, categories may be indicated in the panel 260. For example, the participant list 264 may be color coded based on category or sorted based on category. For example, entry originators may appear red, original recipients may appear yellow, added recipients may appear green, and associated entry originator may appear blue. In another example, the participant list 264 may be separated into sub-lists representing participant categories separated by headers representing the different participant categories.

The panel 260 may also include a graphical element 260 which the user may select to request to be removed from the participant list 264, as previously described. The graphical element 260 may appear adjacent to the user's name in the participant list 264. For example, the graphical element 260 may be a link with the text "Remove."

Figure 3:
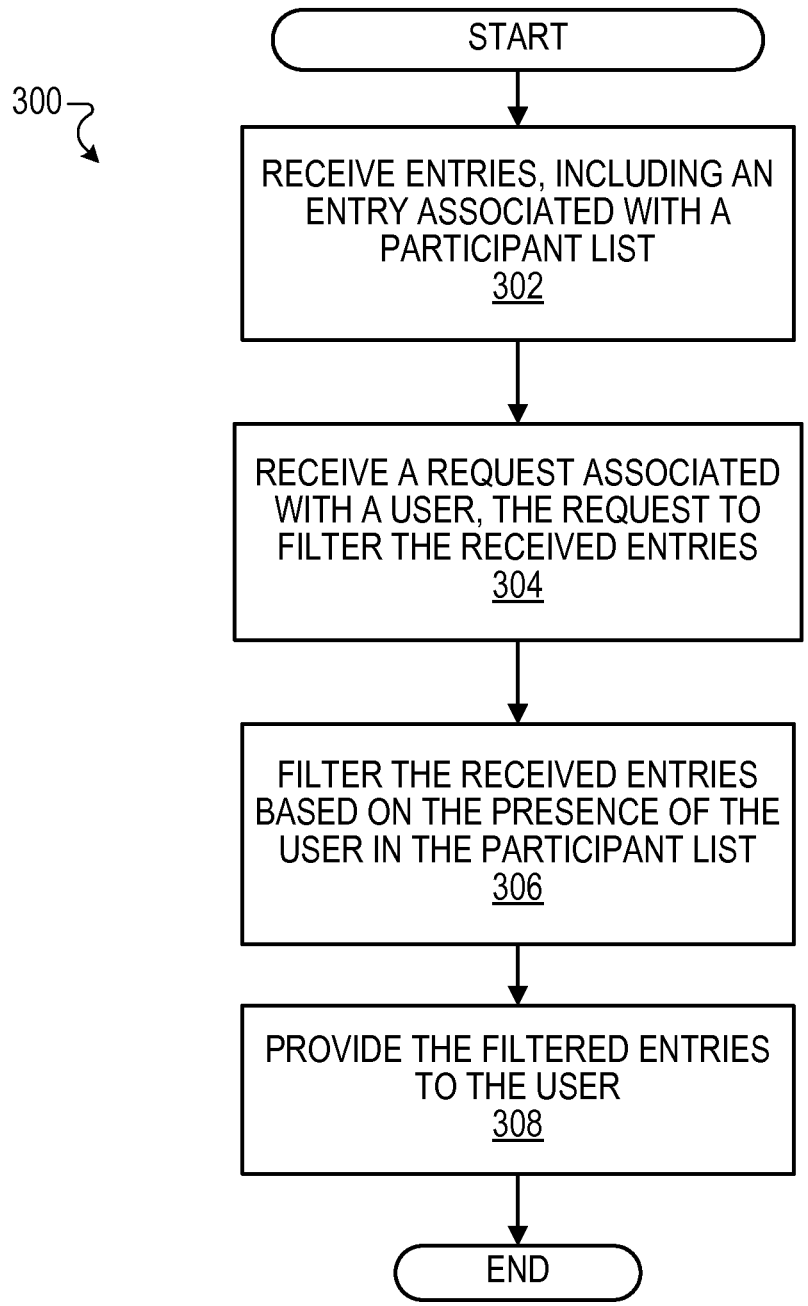
FIG. 3 is a flowchart illustrating an example of a process for filtering entries using participant lists.

FIG. 3 is a flowchart illustrating an example of a process 300 for filtering entries using participant lists. The process 300 may be performed by components of the system 100. For example, the process 300 may be performed by the client device 102, the social network provider 110, or a combination of the two. The following describes the process 300 as being performed by components of system 100. However, the process 300 may be performed by other systems or system configurations. Notably, while process 300 depicts a filtering operation, an analogous process can be used to perform a sorting operation or a combination sorting and filtering operation.

The client device 102 may receive entries in a social network platform (302). For example, the client device 102 may receive entries from the social network provider 110 via the network 130. The entries received by the client device 102 may include an entry associated with a participant list. For example, only one of the received entries may be associated with a participant list or all of the received entries may each be associated with a separate or shared participant list. The participant list may identify one or more users as a participant for the entry and may identify or be associated with metadata that identifies one or more participant categories to which the user belongs. For example, the participant list may identify a user as a participant of the entry under the original recipient category and a group of users as a participant of the entry under the added recipient category.

The client device 102 may receive a request associated with a user (304). For example, the client device 102 may receive a request from the user 106 via the interface 104 provided to the user 106 on the client device 102. The request from the user 106 may include an identification that the request came from the user 106. The request may be a request that the received entries be filtered based on the presence of the user in the corresponding participant lists of the entries. For example, the client device 102 may receive the request when the user 106 selects an option to filter a social feed to show only entries in which the user 106 is participating. In other examples, the request may indicate selection of an option to filter the social feed in accordance with any one or more of the filtering options described previously with respect to FIG. 2A.

The client device 102 may filter the received entries based on the presence of the user in the participant list (306). For example, the client device 102 may analyze the participant list associated with each received entry and filter out entries for which the user 106 is not in the associated participant list, e.g., not directly listed or in a listed group.

The client device 102 may provide the filtered entries to the user (308). For example, the client device 102 may prevent the display of a received entry where the user is not present in a participant list associated with the entry. The client device 102 may determine to only display received entries where the user is present in a participant list associated with the entry. The client device 102 may display the filtered entries in a social feed shown in interface 104. The social feed may include filtered entries in a reverse chronological order of creation time. For example, if the user is in the participant lists associated with two unrelated entries created two days apart, the client device 102 may display the later created entry above the earlier created entry.

Additionally or alternatively, portions of the process 300 may be performed by the social network provider 110. For example, the social network provider 110 may receive entries from client devices 102 and 122, receive the request, filter the received entries based on the request, and provide the filtered entries to the client device 102 for the client device 102 to display the filtered entries to the user 106.

Figure 4:
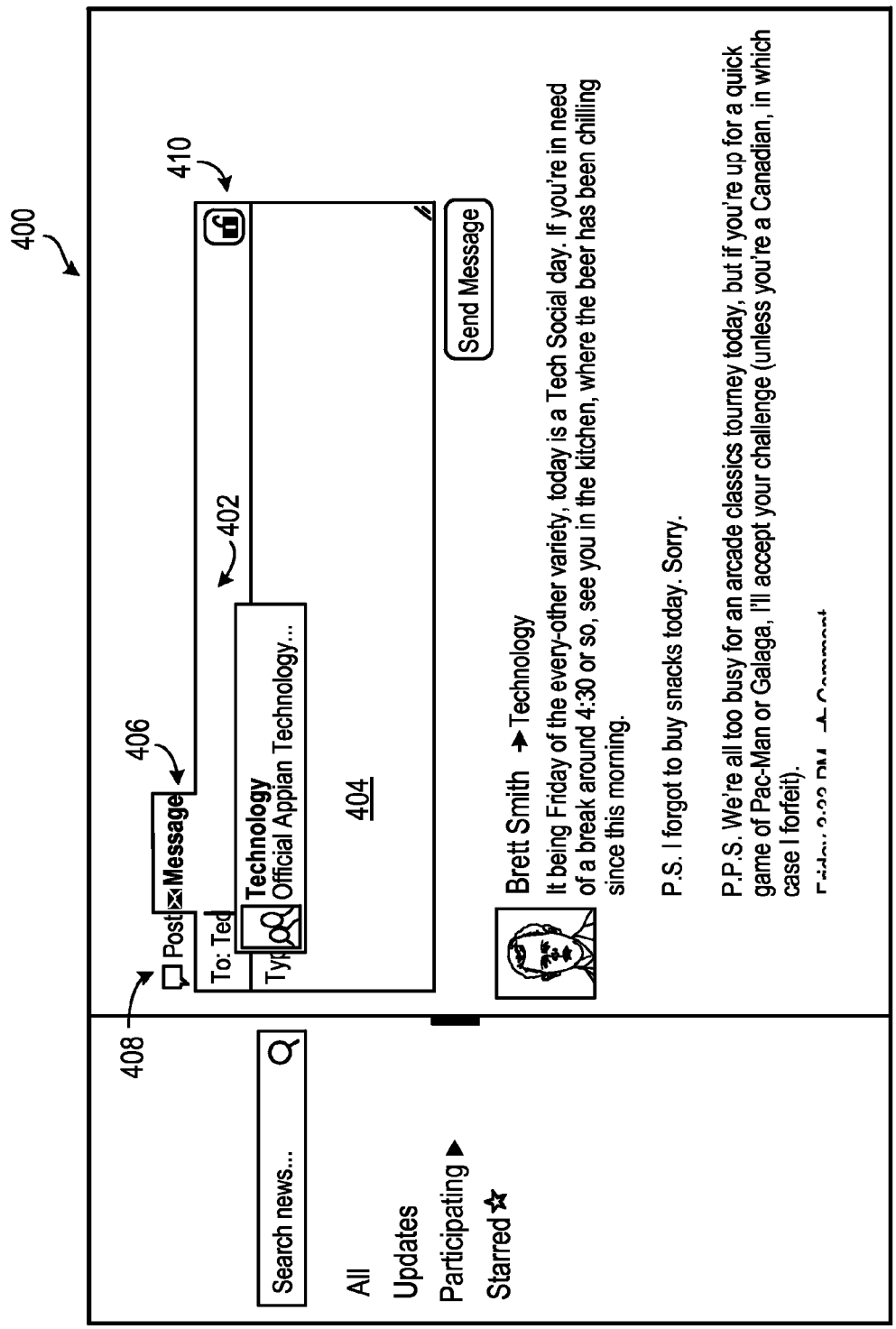
FIG. 4 is an example interface for creating an entry with a designated recipient.

FIG. 4 is an example interface 400 for creating an entry with a designated recipient. Interface 400 is explained in reference to system 100 described in FIG. 1. However, interface 400 may be used with alternate systems or different configurations of system 100.

The entry being created using interface 400 is a message, rather than a post, because the user inputs during entry creation user identifiers and/or group identifiers corresponding to one or more designated recipients within a recipient textbox 402. The system 100 may autocomplete the inputted user or group identifiers as the user types or otherwise inputs the identifiers into the textbox 402 by accessing and comparing the partially inputted user or group identifier to a stored set of known user and group identifiers. For example, if the user types "Tec" into the recipient textbox 402, the system 100 may determine, based on the current input of "Tec," that the user desires to designate the group "Technology" and, as a result, autocompletes the identifier to be the group identifier "Technology."

Instead of including a recipient textbox 402, an interface may also include other input widgets, e.g., drop down menus, radio buttons, selectable thumbnails, etc. Additionally or alternatively, the system 100 may determine designated recipients based on inline tags in the text of an entry (e.g., inputted into textbox 404). For example, the text of an entry may include the tag "#Technology."

Interface 400 further includes user-selectable graphical tabs 406 and 408. Tab 406 is currently selected and indicates that the user desires to create a message, rather than a post. If the user instead selects tab 408, a user interface 600, which is described below with respect to FIG. 6, may instead be presented to the user to enable the user to create a post.

Notably, in some implementations, the interface 400 may be limited to enabling a user to create the single unrelated/unassociated entry of an entry family, with users only being able to create the additional related/associated entries by inputting into a comment textbox like, for example, textbox 216 shown in FIG. 2A. Notably, in some implementations, the comment textbox does not enable a user to designate recipients and, therefore, entering a comment results in generating a message entry having the same designated recipients as that specified by the original unrelated/unassociated entry originator. In other implementations, the comment textbox does allow a contributing user to add, but not remove, other designated recipients. In other implementations, the comment textbox allows the contributing user to both add and remove other designated recipients. In some implementations, the entry originator (i.e., the originator of the unrelated/unassociated entry that began the family) is presented with a confirmation message that allows him to approve or reject any change to the designated recipients made by a contributor. In some implementations, the added or removed designated recipients are specific to the individual related/associated entry. In other implementations, the added or removed designated recipients apply to all entries in the entry family.

In some implementations, entries may be locked or unlocked. Locked entries may be viewed by only users that are listed in the participant list associated with the locked entries. For example, if a user is not listed as the originator of a locked message, an original recipient of the locked message, or an added recipient of the locked message, the user may be unable to view the locked message. In contrast, unlocked entries may be viewed by users that are not in the participant list associated with the unlocked entry. For example, an unlocked entry may be viewed by any user able to access the social feed provided by the social network platform. Entries may also be sorted and/or filtered based on whether the entry is locked or unlocked. For example, locked entries may be shown before unlocked entries; only locked entries may be shown; or only unlocked entries may be shown.

Users may be able to designate whether an entry is a locked entry or an unlocked entry. In some implementations, when an entry originator creates an entry, the interface 400 may allow the user to designate whether the entry is a locked entry or an unlocked entry. For example, the user may designate whether the entry should be locked or not locked by interacting with a displayed graphical element 410. The displayed graphical element may be icon, which may be positioned next to a text box in which the user may input text for the entry and may be selectable by the user when generating the entry. The icon may be an open lock when not selected (i.e., entry is not locked) and a closed lock when selected (i.e., entry is locked). In other implementations, the user may designate an entry as being locked or unlocked by interacting with another graphical element such as, for example, a drop-down menu that includes a lock/unlock toggle option, or a pop-up window that prompts the user to make a selection to lock or not lock the entry prior to entry submission. If the user does not designate whether an entry submitted by the user is a locked entry or an unlocked entry, the entry may, by default, be designated as an unlocked entry.

Figure 5:
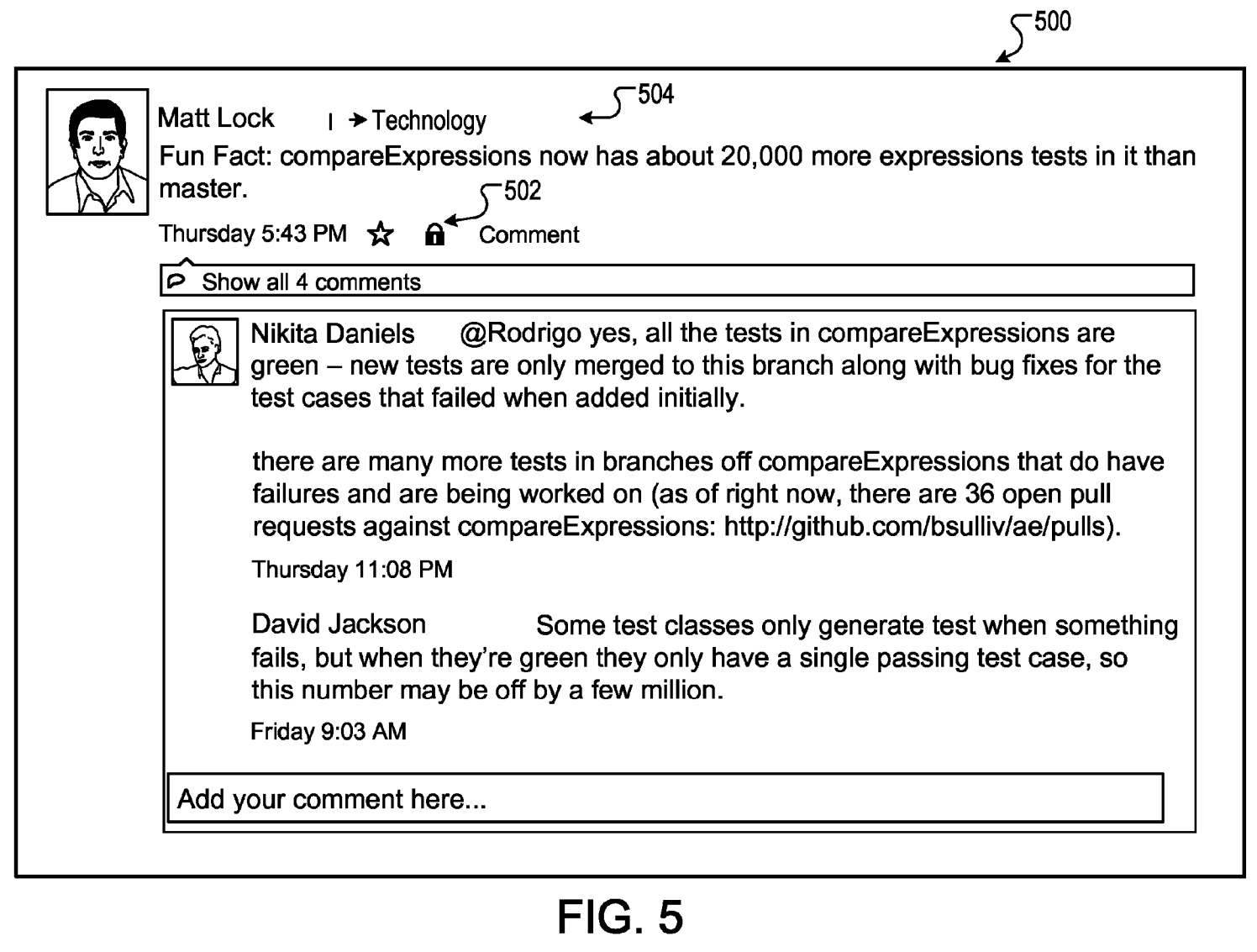

FIG. 5 is an example interface 500 showing a locked entry. The interface 500 may include an icon 502 positioned within or in close proximity to an entry 504 to indicate whether the entry is locked or unlocked. For example, the icon 502 may be highlighted to indicate that the entry 504 is locked. Alternatively, the icon 502 may be grayed out or may be missing, or replaced with another icon, e.g., an unlocked symbol, to indicate that the corresponding entry 504 is unlocked.

The interface may, alternatively or additionally, allow a user to toggle whether an existing entry is locked or unlocked. For example, a widget that the user may interact with to lock or unlock the entry may be displayed in the entry. The ability to toggle the locked/unlocked status of an entry may be limited to the entry originator or other predetermined users (e.g., system administrators).

In some implementations, a lock or unlock designation applies to an entry family (i.e., to all entries within the entry family), rather than to an individual entry. As such, the originator of the single, unrelated/unassociated entry is able to designate whether the whole entry family is locked or unlocked. In some implementations, only the originator of the single, unrelated/unassociated entry is able to change the locked/unlocked status of the entry family. In other implementations, the associated/related entry originators (or contributors) also can change the locked/unlocked status of the entry family. In some implementations, only the originator of the single, unrelated/unassociated entry is able to modify the participant list of a locked entry family by adding other recipients. In other implementations, any participant already included in the participant list of the locked entry family can modify the participant list by, for example, adding other recipients.

In some implementations, the icon 502 may be shown once for a whole entry family to designate that all entries within the entry family are locked. For example, the icon 502 may be shown in close proximity to the original unassociated/unrelated entry that began the family and may not be shown next to each of the related/associated entries or comments within the family. Entry families may be sorted and/or filtered based on whether the entry family is locked or unlocked. For example, locked entry families may be shown before unlocked entry families; only locked entry families may be shown; or only unlocked entry families may be shown.

Figure 6:
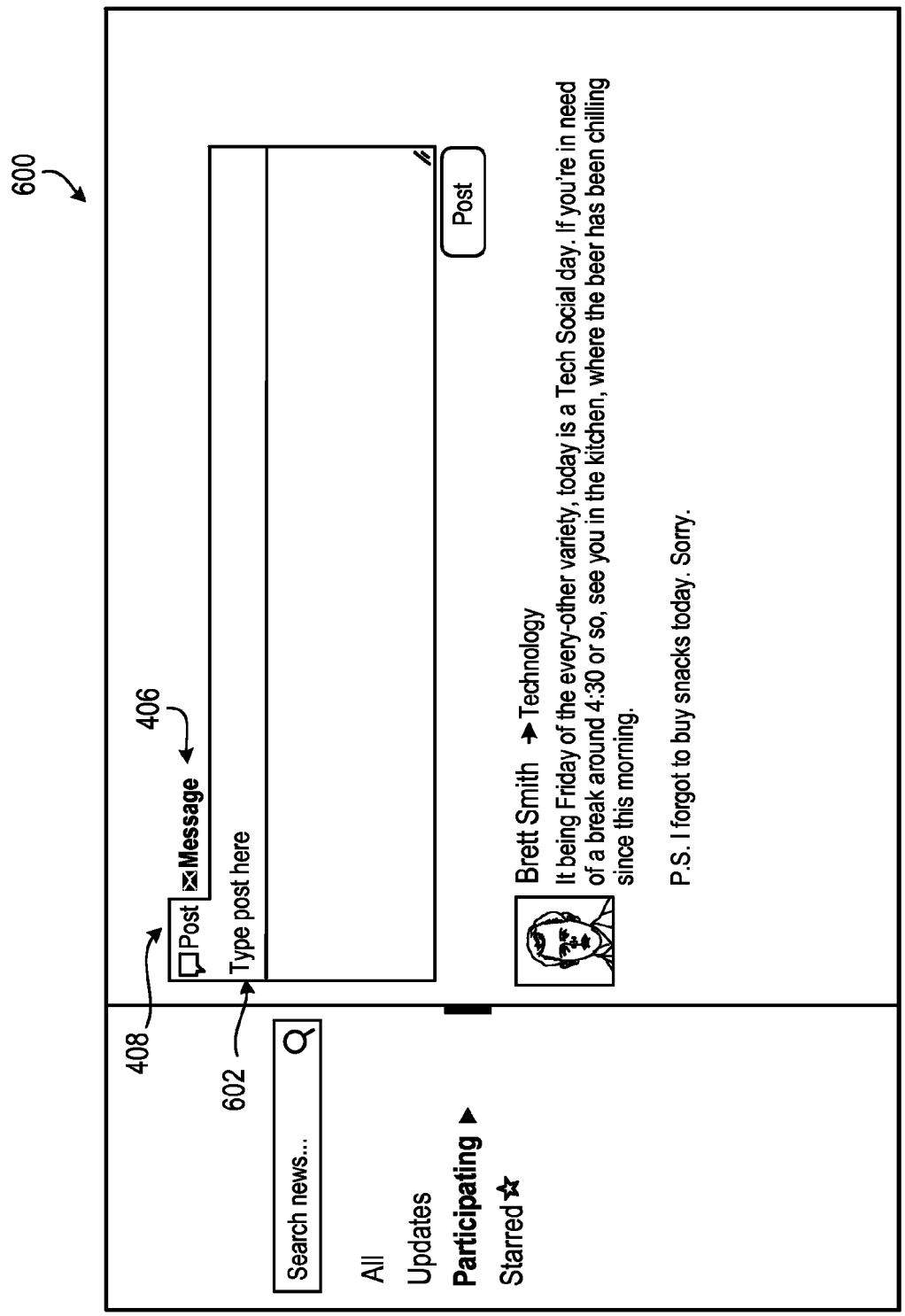
FIG. 6 is an example interface for creating an entry without designated recipients.

FIG. 6 is an example interface 600 for creating a post, i.e., an entry without designated recipients. As noted above with respect to FIG. 4, a user may access interface 600 by selecting the tab 408. The interface 600 may include a post creation area 602 where a user may input text for a post. The post may be created with initially only the user, e.g., the entry originator, in the participant list. Other users that comment on the post may then be added to the participant list, as well as other users added as added recipients by users.

Notably, in some implementations, the interface 600 may be limited to enabling a user to create the single unrelated/unassociated entry of an entry family, with users only being able to create the additional related/associated entries by inputting into a comment textbox like, for example, textbox 216 shown in FIG. 2A. Notably, in some implementations, the comments inputted by the other users may inherit the characteristics of posts, rather than messages, because the original unrelated/unassociated entry that began the entry family was a post and not a message. In other implementations, the comment textbox allows a contributing user to add designated recipients for their individual entry or for the entry family. In some implementations in which the designated recipients is the same for all entries in an entry family, a contributing user may not be able to remove other recipients designated by other contributors for the family. In other implementations in which the designated recipients is the same for all entries in an entry family, a contributing user may be able to remove other recipients designated by other contributors for the family. In some implementations, the entry originator (i.e., the originator of the unrelated/unassociated entry that began the family) is presented with a confirmation message that allows her to approve or reject any specification of designated recipients or modification to designated recipients made by a contributor.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for providing persistence in a social network platform, the method comprising:
    receiving entries in the social network platform, the entries including an entry associated with a participant list that (i) identifies one or more users as a participant for the entry and (ii) does not identify a particular user, wherein the received entries can be viewed by any user including the particular user that is not in the participant list and the received entries can be filtered only to the users included in the participant list;
    providing the entry to the particular user in response to a request from the particular user for entries in the social network platform;
    determining (i) that a communication from the particular user is a comment that responds to a communication of another user to the entry in the social network and (ii) that the entry in the social network is associated with a participant list that does not identify the particular user;
    in response to determining (i) that the communication from the particular user is a comment that responds to the communication of another user to the entry in the social network and (ii) that the entry in the social network is associated with a participant list that does not identify the particular user, including an identifier for the particular user in the participant list for the entry;

receiving a filter request for the particular user, the filter request being a request to filter the received entries based on the presence of the identifier for the particular user in the participant list;

filtering the received entries based on the presence of the identifier for the particular user in the participant list; and providing the filtered entries including the entry to the particular user.

2. The method of claim 1, wherein providing the filtered entries to the user comprises enabling the user to perceive the filtered entries in a social feed that includes the filtered entries in a reverse chronological order of creation time of the filtered entries.

3. The method of claim 2, wherein enabling the user to perceive the filtered entries comprises preventing display of a received entry for which the user is not present in a participant list associated with the entry.

4. The method of claim 1, wherein the entries comprise discrete pieces of information including at least one of messages, posts, or events.

5. The method of claim 4, wherein the entries include at least one message, the message being a communication having at least one recipient designated to receive the communication by a creator of the message through a specification of one or more user identifiers corresponding to the at least one designated recipient.

6. The method of claim 4, wherein the entries include at least one post, the post being a communication for which no recipients were designated to receive the communication by a creator of the post through a specification of one or more user identifiers corresponding to the at least one designated recipient.

7. The method of claim 4, further comprising:
obtaining a determination whether a condition has been met, the determination based on automatic monitoring of a set of parameters; and
determining, by the social network platform and based on the monitoring, that the condition has been met,
wherein the entries include at least one event, the event being a communication indicating that the condition has been met, the communication being automatically generated by the social network platform in response to determining that the condition has been met.

8. The method of claim 1, wherein the participant list identifies each of the one or more users as a participant assigned to at least one of multiple different participant categories, each participant category indicating characteristics of the participant with respect to how the participant joined a conversation on a topic.

9. The method of claim 8, wherein the participant list identifies each of one or more users as a participant assigned to an entry originator category, the entry originator category corresponding to a user that originated a communication that introduces the topic of the conversation to an audience.

10. The method of claim 8, wherein the participant list identifies each of one or more users as a participant assigned to an original recipient category, the original recipient category corresponding to users designated as recipients of a communication that introduces the topic of the conversation to an audience, the users being designated as the recipients by a creator of the communication at a time the communication was created.

11. The method of claim 8, wherein the participant list identifies each of one or more users as a participant assigned to an added recipient category, the added recipient category corresponding to users designated as recipients of a communication that introduces the topic of the conversation to an audience, the users being designated as recipients by a second user in the audience after the communication that introduces the topic was perceived by the audience.

12. The method of claim 8, wherein the participant list identifies each of one or more users as a participant assigned to a contributor category, the contributor category corresponding to users that perceive a first communication that introduces the topic of the conversation to an audience and that respond to the first communication by providing a second communication for perception by the audience, the second communication commenting on the topic of the conversation.

13. The method of claim 8, wherein filtering the received entries comprises filtering the received entries based on the participant category assigned to the particular user.

14. The method of claim 1, wherein the entry associated with the participant list is assigned a locked status entry or an unlocked status to the entry, and further comprising:
limiting access to the entry to particular users when the entry is assigned the locked status; and
not limiting access to the entry to particular users when the entry is assigned the unlocked status.

15. The method of claim 1, further comprising:
receiving a removal request from the particular user to remove the particular user from the participant list associated with the entry;
providing a confirmation request to an approver to approve the removal request; receiving an approval to remove the particular user from the participant list in response to the confirmation request; and
removing the particular user from the participant list in response to receiving the approval.

16. The method of claim 1, further comprising:
receiving a request from the particular user to add another user to the participant list associated with the entry; and
adding an identifier for the other particular user to the participant list in response to the request.

17. The method of claim 1, wherein receiving the entries comprises generating the participant list based on inline tags in text of the entry.

18. A system for providing persistence in a social network platform, the system comprising:
a processor;
one or more instructions encoded in a non-transitory computer-readable storage medium for execution by the processor, the one or more instructions when executed by the processor operable to:
receiving entries in the social network platform, the entries including an entry associated with a participant list that (i) identifies one or more users as a participant for the entry and (ii) does not identify a particular user, wherein the received entries can be viewed by any user including the particular user that is not in the participant list and the received entries can be filtered only to the users included in the participant list;
providing the entry to the particular user in response to a request from the particular user for entries in the social network platform;
determining (i) that a communication from the particular user is a comment that responds to a communication of another user to the entry in the social network and (ii)

that the entry in the social network is associated with a participant list that does not identify the particular user;

in response to determining (i) that the communication from the particular user is a comment that responds the communication of another user to the entry in the social network and (ii) that the entry in the social network is associated with a participant list that does not identify the particular user, including an identifier for the particular user in the participant list for the entry;

receiving a filter request for the particular user, the filter request being a request to filter the received entries based on the presence of the identifier for the particular user in the participant list;

filtering the received entries based on the presence of the identifier for the particular user in the participant list; and providing the filtered entries including the entry to the particular user.

19. A computer program product, embodied in a non-transitory computer-readable medium and including instructions executable by a processor, the instructions when executed configured to cause the processor to perform operations comprising:

receiving entries in a social network platform, the entries including an entry associated with a participant list that (i) identifies one or more users as a participant for the entry and (ii) does not identify a particular user, wherein the received entries can be viewed by any user including the particular user that is not in the participant list and the received entries can be filtered only to the users included in the participant list;

providing the entry to the particular user in response to a request from the particular user for entries in the social network platform;

determining (i) that a communication from the particular user is a comment that responds to a communication of another user to the entry in the social network platform and (ii) that the entry in the social network platform is associated with a participant list that does not identify the particular user;

in response to determining (i) that the communication from the particular user is a comment that responds to the communication of another user to the entry in the social network platform and (ii) that the entry in the social network platform is associated with a participant list that does not identify the particular user, including an identifier for the particular user in the participant list for the entry;

receiving a filter request for the particular user, the filter request being a request to filter the received entries based on the presence of the identifier for the particular user in the participant list;

filtering the received entries based on the presence of the identifier for the particular user in the participant list; and providing the filtered entries including the entry to the particular user.

* * * * *